(12) United States Patent
Ito et al.

(10) Patent No.: US 9,022,662 B2
(45) Date of Patent: May 5, 2015

(54) RETAINER MADE OF SYNTHETIC RESIN FOR USE IN BALL BEARING AND BALL BEARING

(75) Inventors: Chiharu Ito, Kuwana (JP); Hikaru Ishida, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 14/126,524

(22) PCT Filed: Jun. 14, 2012

(86) PCT No.: PCT/JP2012/065220
§ 371 (c)(1),
(2), (4) Date: Dec. 16, 2013

(87) PCT Pub. No.: WO2013/002036
PCT Pub. Date: Jan. 3, 2013

(65) Prior Publication Data
US 2014/0112608 A1     Apr. 24, 2014

(30) Foreign Application Priority Data
Jun. 27, 2011     (JP) .................................. 2011-141736

(51) Int. Cl.
*F16C 19/00*     (2006.01)
*F16C 33/38*     (2006.01)
(Continued)

(52) U.S. Cl.
CPC ............. *F16C 33/38* (2013.01); *F16C 33/6614* (2013.01); *F16C 19/06* (2013.01);
(Continued)

(58) Field of Classification Search
CPC .. F16C 33/38; F16C 33/3862; F16C 33/3868; F16C 33/3875; F16C 33/3887; F16C 33/6614; F16C 33/6651

USPC .......... 384/470, 523, 528, 529, 530, 614, 526
See application file for complete search history.

(56) References Cited

U.S. PATENT DOCUMENTS 851,697 A * 4/1907 Schneider ..................... 384/526
993,471 A * 5/1911 Swift ............................ 384/526
(Continued)

FOREIGN PATENT DOCUMENTS

| JP | 09-303402 | 11/1997 |
|----|-----------|---------|
| JP | 2003-049841 | 2/2003 |

(Continued)

OTHER PUBLICATIONS

International Search Report issued Sep. 4, 2012 in International (PCT) Application No. PCT/JP2012/065220.
(Continued)

*Primary Examiner* — Alan B Waits
(74) *Attorney, Agent, or Firm* — Wenderoth, Lind & Ponack, L.L.P.

(57) ABSTRACT

A retainer of synthetic resin is provided in such a way that abnormal heat generation in a bearing and wear of the retainer due to interference between the retainer and balls are less likely to arise while the bearing is rotating at a high speed. A retainer (5) of synthetic resin includes two annular members (10) made of synthetic resin and facing each other in the axial direction, the annular members defining therebetween a plurality of circumferentially spaced apart pockets (11) in which respective balls (4) are received. Concave spherical surfaces (23) are formed at the circumferential ends of the respective pockets (11) so as to extend along the outer peripheries of the balls (4), and cylindrical surfaces (22) are formed at the axial ends of the respective pockets (11).

21 Claims, 8 Drawing Sheets

(51) Int. Cl.
*F16C 33/66* (2006.01)
*F16C 19/06* (2006.01)
*F16C 33/32* (2006.01)
*F16C 33/44* (2006.01)

(52) U.S. Cl.
CPC ............ *F16C 33/32* (2013.01); *F16C 33/6629* (2013.01); *F16C 33/3887* (2013.01); *F16C 33/44* (2013.01); *F16C 2206/40* (2013.01); *F16C 33/3875* (2013.01); *F16C 2226/74* (2013.01)

(56) References Cited

U.S. PATENT DOCUMENTS

| | | | | |
|---|---|---|---|---|
| 1,006,688 | A * | 10/1911 | Schneider | 384/523 |
| 1,103,965 | A * | 7/1914 | Hoffmann | 384/526 |
| 1,494,012 | A * | 5/1924 | Parsons | 384/530 |
| 1,738,359 | A * | 12/1929 | Dake | 384/523 |
| 2,061,999 | A * | 11/1936 | Foss | 384/526 |
| 2,712,481 | A * | 7/1955 | Martin | 384/526 |
| 2,861,849 | A * | 11/1958 | Case | 384/527 |
| 3,471,208 | A * | 10/1969 | Vannest | 384/530 |
| 3,586,405 | A * | 6/1971 | Claesson | 384/526 |
| 4,572,678 | A * | 2/1986 | Neder et al. | 384/533 |
| 4,626,113 | A * | 12/1986 | Forknall et al. | 384/530 |
| 4,838,712 | A * | 6/1989 | Kubo et al. | 384/523 |
| 4,844,628 | A * | 7/1989 | Knappe | 384/510 |
| 4,902,145 | A * | 2/1990 | Johnson | 384/530 |
| 5,388,918 | A * | 2/1995 | Williams | 384/530 |
| 5,806,990 | A * | 9/1998 | Ueno et al. | 384/530 |
| 6,368,245 | B1 * | 4/2002 | Goto et al. | 476/46 |
| 7,059,776 | B2 * | 6/2006 | Kobayashi et al. | 384/470 |
| 7,178,982 | B2 * | 2/2007 | Chin-Pei et al. | 384/51 |
| 7,507,028 | B2 * | 3/2009 | Markle | 384/523 |
| 7,703,986 | B2 * | 4/2010 | Naito | 384/526 |
| 8,100,025 | B2 * | 1/2012 | Lin | 74/424.88 |
| 8,317,404 | B2 * | 11/2012 | Sato et al. | 384/523 |
| 2004/0234181 | A1 * | 11/2004 | Kobayashi et al. | 384/528 |
| 2004/0252925 | A1 * | 12/2004 | Gotoh | 384/528 |
| 2006/0008192 | A1 * | 1/2006 | Sekimoto et al. | 384/523 |
| 2006/0115193 | A1 * | 6/2006 | Begin | 384/523 |
| 2007/0230849 | A1 * | 10/2007 | Naito | 384/530 |
| 2007/0248295 | A1 * | 10/2007 | Kerr | 384/470 |
| 2009/0129713 | A1 * | 5/2009 | Hattori | 384/462 |
| 2010/0098366 | A1 * | 4/2010 | Sato et al. | 384/530 |
| 2010/0166352 | A1 * | 7/2010 | Morita et al. | 384/462 |
| 2011/0135234 | A1 * | 6/2011 | Hosmer | 384/523 |
| 2013/0087413 | A1 * | 4/2013 | Carter et al. | 184/6.11 |

FOREIGN PATENT DOCUMENTS

| | | |
|---|---|---|
| JP | 2005-069271 | 3/2005 |
| JP | 2006-226448 | 8/2006 |
| JP | 2007-040383 | 2/2007 |
| JP | 2007-078059 | 3/2007 |
| JP | 2008-151181 | 7/2008 |
| JP | 2009-144745 | 7/2009 |

OTHER PUBLICATIONS

Written Opinion of the International Searching Authority issued Sep. 4, 2012 in International (PCT) Application No. PCT/JP2012/065220 (with English translation).

* cited by examiner

RETAINER MADE OF SYNTHETIC RESIN FOR USE IN BALL BEARING AND BALL BEARING

TECHNICAL FIELD

The present invention relates to a retainer of synthetic resin for use in a ball bearing, wherein the retainer includes two annular members made of synthetic resin and facing each other in the axial direction, and a ball bearing in which the retainer is incorporated.

BACKGROUND ART

Generally, a ball bearing includes an inner race, an outer race, a plurality of balls mounted between the inner race and the outer race so as to be spaced from each other in the circumferential direction, and a retainer retaining the balls. Although retainers made of metal and thus having high rigidity have been widely used in ball bearings for motors, retainers made of synthetic resin, which are quieter during operation and lighter in weight than retainers made of metal, are also widely used in recent years.

A retainer made of synthetic resin is disclosed in Japanese Unexamined Patent Application Publication No. 2006-226448. This retainer includes two annular members made of synthetic resin and facing each other in the axial direction. A plurality of circumferentially spaced apart pockets are defined between the two annular members in which the respective balls are received.

Also, according to how they are guided, retainers are divided into two types. A retainer of the first type is positioned in the radial direction by contact with a bearing race ("bearing race-guided type"). A retainer of the second type is positioned in the radial direction by contact with the balls ("ball-guided type"). The synthetic resin retainer described in Japanese Unexamined Patent Application Publication No. 2006-226448 is of the ball-guided type.

In the above synthetic resin retainer, the inner surface of each pocket is a concave spherical surface except for a grease reservoir provided at each circumferential end of the pocket. When such a retainer was used in a ball bearing for a motor that rotates at a high speed, there was a situation in which abnormal heat generation in the bearing or abnormal wear of the retainer arose.

SUMMARY OF THE INVENTION

The inventors of the present invention investigated the cause of such abnormal heat generation in the bearing and wear of the retainer and discovered the following: Large centrifugal force which acts on the synthetic resin retainer while the bearing is rotating at a high speed causes the retainer to be radially expanded such that the pockets in the retainer move radially outwardly. This reduces gaps in the pockets (gaps between the inner surfaces of the respective pockets and the balls) on the inner diameter side of the retainer.

The inventors also discovered the following: When the retainer is radially expanded by centrifugal force, the pockets in the retainer are stretched in the circumferential direction and the width of the pockets narrows in the axial direction so that the gaps in the pockets in the retainer decrease in the axial direction.

The inventors finally discovered the following: Due to the combined effect of the above two phenomena, the axial ends of the pockets in the retainer interfere (especially at their radially inner portions) with the balls, thus causing abnormal heat generation in the bearing and wear of the retainer.

One way to prevent abnormal heat generation in the bearing and wear of the retainer due to interference between the retainer and the balls would be to set larger gaps in the pockets in advance. However, since the retainer moves greatly when the bearing rotates at a low speed, such larger gaps in the pockets tend to induce a collision sound between the retainer and the balls (retainer sound), and also might cause the retainer to move into a state of eccentricity and contact a bearing race while the bearing is rotating at a low speed.

It is an object of the present invention to provide a retainer made of synthetic resin in which abnormal heat generation in the bearing and wear of the retainer due to interference between the retainer and the balls are less likely to arise while the bearing is rotating at a high speed.

A retainer of synthetic resin for use in a ball bearing includes two annular members made of synthetic resin and facing each other in the axial direction, the annular members defining therebetween a plurality of circumferentially spaced apart pockets in which respective balls are received. In order to achieve the above object, in the retainer, concave spherical surfaces are formed at the circumferential ends of the respective pockets so as to extend along the outer peripheries of the balls, and cylindrical surfaces are formed at the axial ends of the respective pockets, at least at their portions located radially inwardly of the pitch circle of the balls so as to extend in the radial direction of the retainer.

As described above, the axial ends of the respective pockets in the retainer are cylindrical surfaces, at least at their portions located radially inwardly of the pitch circle of the balls. Therefore, it is possible to prevent the axial ends of the pockets in the retainer from interfering with the balls when the following two phenomena happen at the same time: (1) the retainer is radially expanded and the pockets in the retainer move radially outwardly; and (2) the pockets in the retainer are stretched in the circumferential direction and the width of the pockets narrows in the axial direction. Therefore, abnormal heat generation in the bearing or wear of the retainer due to interference between the retainer and the balls does not arise while the bearing is rotating at a high speed. Also, it is possible to restrain the movement of the retainer by contact with the concave spherical surfaces at the circumferential ends of the respective pockets and the balls while the bearing is rotating and to prevent a collision sound between the retainer and the balls (retainer sound).

The concave spherical surfaces at the circumferential ends of the respective pockets can be formed so as to extend both radially outwardly and radially inwardly from the pitch circle of the balls. Under this situation, since the balls can be guided more effectively by the concave spherical surfaces, it is possible to prevent a retainer sound effectively and to enhance quietness.

The concave spherical surfaces at the circumferential ends of the respective pockets can be formed at their portions located radially outwardly of the pitch circle of the balls, and cylindrical surfaces can be formed at the circumferential ends of the respective pockets so as to extend in the radial direction of the retainer and be smoothly connected with the concave spherical surfaces. Under this situation, when the synthetic resin retainer is radically largely expanded by powerful centrifugal force while the ball bearing is rotating at a super-high speed and the pockets in the retainer move greatly radially outwardly, it is possible to prevent the circumferential ends of the pockets in the retainer from interfering with the balls. Therefore, it is possible to prevent abnormal heat generation in the bearing and wear of the retainer due to interference between the retainer and the balls while the bearing is rotating at a super-high speed.

The respective annular members can be arranged such that the abutment lines of the two annular members are offset from the axial center of the pockets. Under this situation, there are no abutment lines at portions where the balls and the retainer contact each other most strongly (axial centers of the pockets). Therefore, even if the respective annular members are radially expanded by centrifugal force and slightly stepped portions form along the abutment lines, it is possible to restrain an influence due to the stepped portions and to stabilize the movement of the retainer while the bearing is rotating at a high speed.

In order to enhance lubrication performance between the pockets and the balls, grease reservoirs can be formed at the radial inner ends of the respective pockets. In this case, it is preferable that the grease reservoirs are formed in such a way as to avoid the abutment lines. Under this situation, it is possible to prevent grease stored inside the grease reservoirs from leaking through the abutment lines due to centrifugal force while the bearing is rotating at a high speed and to secure lubrication performance between the pockets and the balls while the bearing is rotating at a high speed. As a result thereof, it is possible to prevent more effectively abnormal heat generation in the ball bearing or wear of the retainer while the bearing is rotating at a high speed.

If the annular members are each provided with grease-guiding slant faces on its inner periphery and the slant faces are each inclined in the direction in which grease can be guided to the corresponding one of the grease reservoirs when centrifugal force acts on the grease, grease is guided along the grease-guiding slant faces by centrifugal force and is supplied to the grease reservoirs when the grease adheres to the grease-guiding slant faces. Therefore, it is possible to enhance further lubrication performance between the pockets and the balls while the bearing is rotating at a high speed and to prevent more effectively abnormal heat generation in the ball bearing or wear of the retainer while the bearing is rotating at a high speed.

Furthermore, if the grease-guiding slant faces are each provided with a grease-guiding groove that leads to the corresponding one of the grease reservoirs, the grease-guiding groove being inclined in the direction in which grease can be guided to the corresponding one of the grease reservoirs when centrifugal force acts on the grease, it is possible to supply more effectively grease to the grease reservoirs.

A ball bearing provided in the present invention includes: an inner race; an outer race; a plurality of balls mounted between the inner race and the outer race so as to be spaced from each other in the circumferential direction; and the above synthetic resin retainer retaining the balls. It is more preferable that the balls in this ball bearing are made of a ceramic material, which is lower in specific gravity than iron. Under this situation, since the balls are light in weight, it is possible to restrain the impact when the balls and the retainer collide with each other and to enhance quietness while the bearing is rotating at a high speed.

In the synthetic resin retainer according to the present invention, the axial ends of the respective pockets in the retainer are cylindrical surfaces, at least at their portions located radially inwardly of the pitch circle of the balls. Therefore, it is possible to prevent the axial ends of the pockets from interfering with the balls such that abnormal heat generation in the bearing or wear of the retainer due to interference between the retainer and the balls does not arise when the following two phenomena happen at the same time: (1) the pockets in the retainer move radially outwardly due to centrifugal force while the bearing is rotating at a high speed; and (2) the pockets are stretched in the circumferential direction and the width of the pockets narrows in the axial direction.

DETAILED DESCRIPTION OF THE INVENTION

Figure 1:
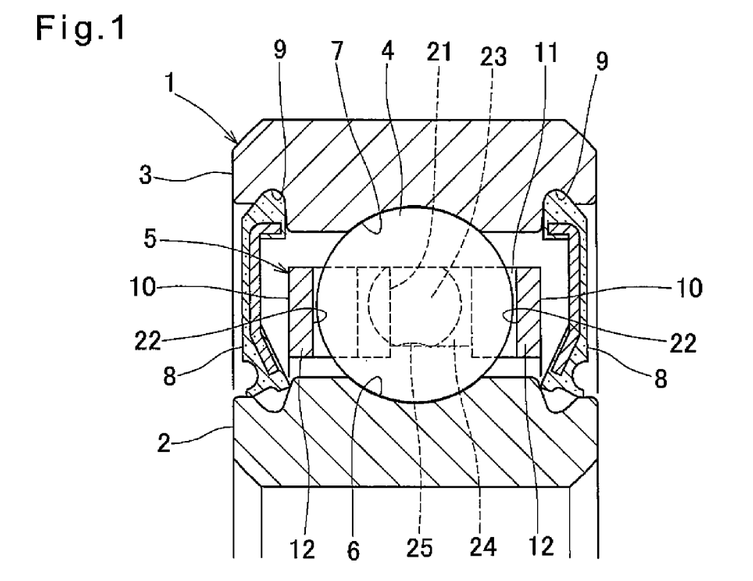
FIG. 1 is a sectional view of a ball bearing in which a retainer of synthetic resin according to a first embodiment of the present invention is incorporated.

The first embodiment of the present invention is illustrated in FIG. 1. The ball bearing 1 of this embodiment is a deep groove ball bearing for a motor that rotates at a high speed and includes an inner race 2, an outer race 3, a plurality of balls 4 mounted between the inner race 2 and the outer race 3 so as to be spaced from each other in the circumferential direction, and a retainer 5 retaining the balls 4.

The inner race 2 has in its outer periphery a raceway groove 6 having a circular arc-shaped section and extending in the circumferential direction. The outer race 3 has in its inner periphery a raceway groove 7 having a circular arc-shaped section and extending in the circumferential direction so that the balls 4 roll along the raceway grooves 6 and 7. The balls 4 are made of a ceramic material, which is lower in specific gravity than iron. The ceramic material may be, for example, silicon nitride (Si3N4), of which the specific gravity is half or less than half that of iron.

A pair of seal members 8 are provided between the inner race 2 and the outer race 3 so as to face each other in the axial direction with the balls 4 and the retainer 5 therebetween. The seal members 8 have their outer peripheral portions fixed in respective seal grooves 9 formed in the shoulders of the raceway groove 7 of the outer race 3, and their inner peripheral portions in sliding contact with the outer periphery of the inner race 2. The seal members 8 prevent grease enclosed in the annular space between the inner race 2 and the outer race 3 from leaking out of the ball bearing 1.

The retainer 5 includes two annular members 10 facing each other in the axial direction to define therebetween a plurality of circumferentially equally spaced apart pockets 11 in which the respective balls 4 are received. The retainer 5 is of a ball-guided type, in which the retainer 5 is positioned in the radial direction by contact with the inner surfaces of the pockets 11 and the balls 4. Therefore, the outer periphery of the retainer 5 is not in contact with the outer race 3, and the inner periphery thereof is not in contact with the inner race 2 as well.

The annular members 10 are formed by injection molding of synthetic resin. Because the two annular members 10 have the same shape, the members can be molded by the same metal mold. The synthetic resin forming the annular members 10 may be e.g. a thermoplastic resin such as polyamide (PA), polyphenylene sulfide (PPS) or polyetheretherketone (PEEK). In order to increase strength of the annular members 10, fiber such as glass fiber, carbon fiber or aramid fiber is mixed in the synthetic resin.

Figure 2:
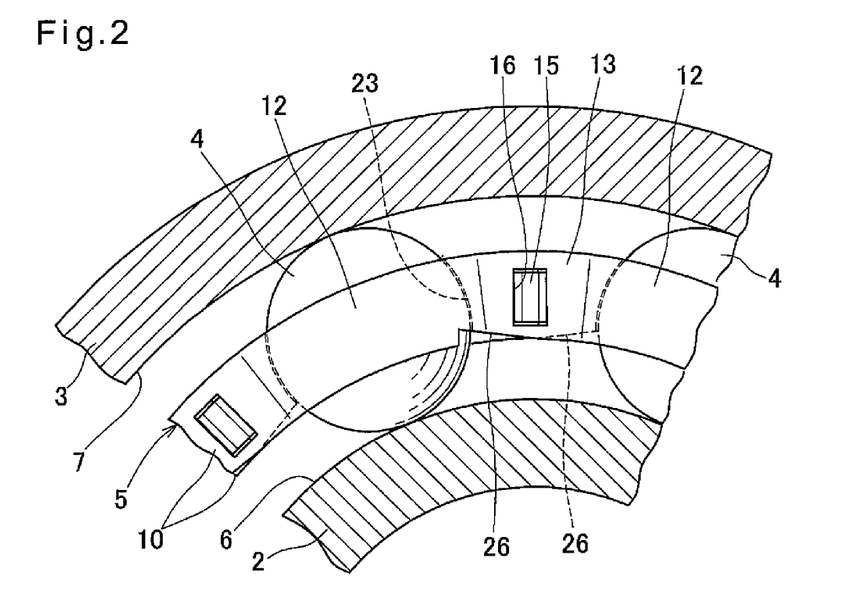
FIG. 2 is a sectional view of the ball bearing illustrated in FIG. 1, taken along a plane perpendicular to the axis of the bearing.
Figure 3:
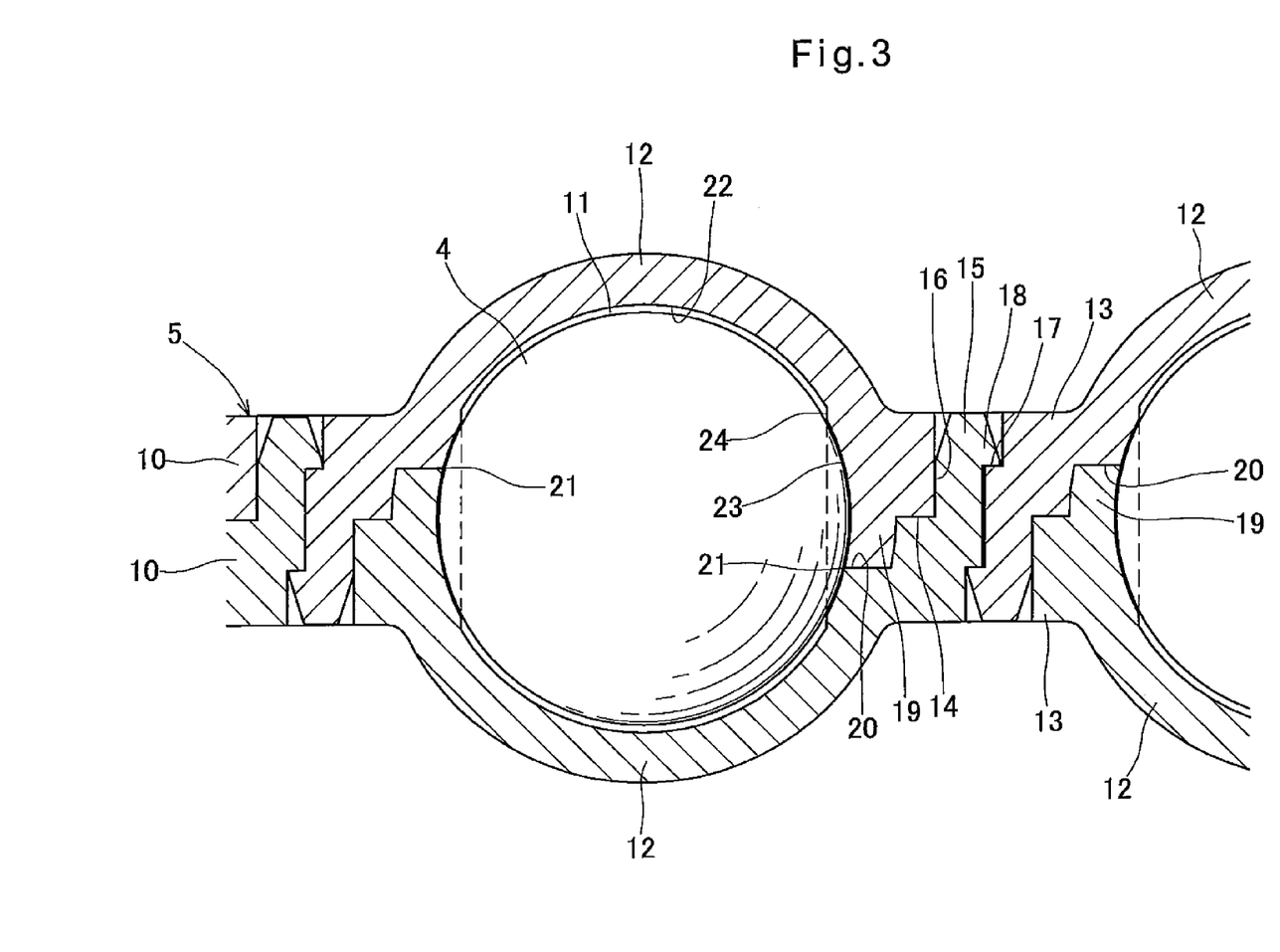
FIG. 3 is a sectional view of the balls and the retainer illustrated in FIG. 2, taken along a virtual cylindrical surface including the pitch circle of the balls and seen from the radially inner side of the bearing.

As illustrated in FIGS. 2 and 3, the respective annular members 10 include circular arc-shaped pocket walls 12 formed so as to be spaced apart from each other in the circumferential direction, and coupling plates 13 through which the circumferentially adjacent pocket walls 12 are coupled together. With the two annular members 10 coupled with each other, the pocket walls 12 restrict the axial movement of the balls 4 and the coupling plates 13 restrict the circumferential movement of the balls 4.

As illustrated in FIG. 3, the coupling plates 13 of each annular member 10 have abutment surfaces 14 configured to be brought into surface contact with the respective abutment surfaces 14 of the other annular member 10 when the two annular members 10 are coupled with each other. The abutment surfaces 14 of each annular member 10 are each formed with a connection claw 15 protruding in the axial direction and a connection hole 16 formed in such a way as to receive the connection claw 15 formed on the corresponding abutment surface 14 of the other annular member 10. The connection claw 15 includes a hook 18 configured to engage a step 17 formed on the inner surface of the connection hole 16 on the opposed abutment surface 14. Engagement of the hooks 18 with the steps 17 stops the connection claws 15 from separating from the connection holes 16 so that the two annular members 10 are rigidly coupled together.

The abutment surfaces 14 of each annular member 10 are each further formed with a protruding wall 19 axially protruding from a first end of the abutment surface, and a fitting recess 20 formed at the second end of the abutment surface opposite to the first end, in which the protruding wall 19 of the corresponding abutment surface 14 of the other annular member 10 is configured to be fitted when the two annular members 10 are coupled with each other. The protruding walls 19 and the fitting recesses 20 serve to shift the abutment lines 21 on the inner walls of the pockets 11, along which the annular members 10 abut each other, from the axial centers of the respective pockets 11.

Cylindrical surfaces 22 are formed at the axial ends of the respective pockets 11. In particular, the inner surfaces of the respective pocket walls 12 are cylindrical surfaces 22, at least at their portions located radially inwardly of the pitch circle p of the balls 4 (see FIG. 5). Therefore, the pocket walls 12 do not interfere with the balls 4 when the retainer 5 is radially expanded by centrifugal force and the pocket walls 12 move radially outwardly. The inner surfaces of the pocket walls 12 may be cylindrical surfaces 22 both at their portions located radially inwardly of and located radially outwardly of the pitch circle p of the balls 4, or only at their portions located radially inwardly of the pitch circle p of the balls 4. In the latter case, the portions located radially outwardly of the pitch circle p may be spherical surfaces.

Figures 5, 6:
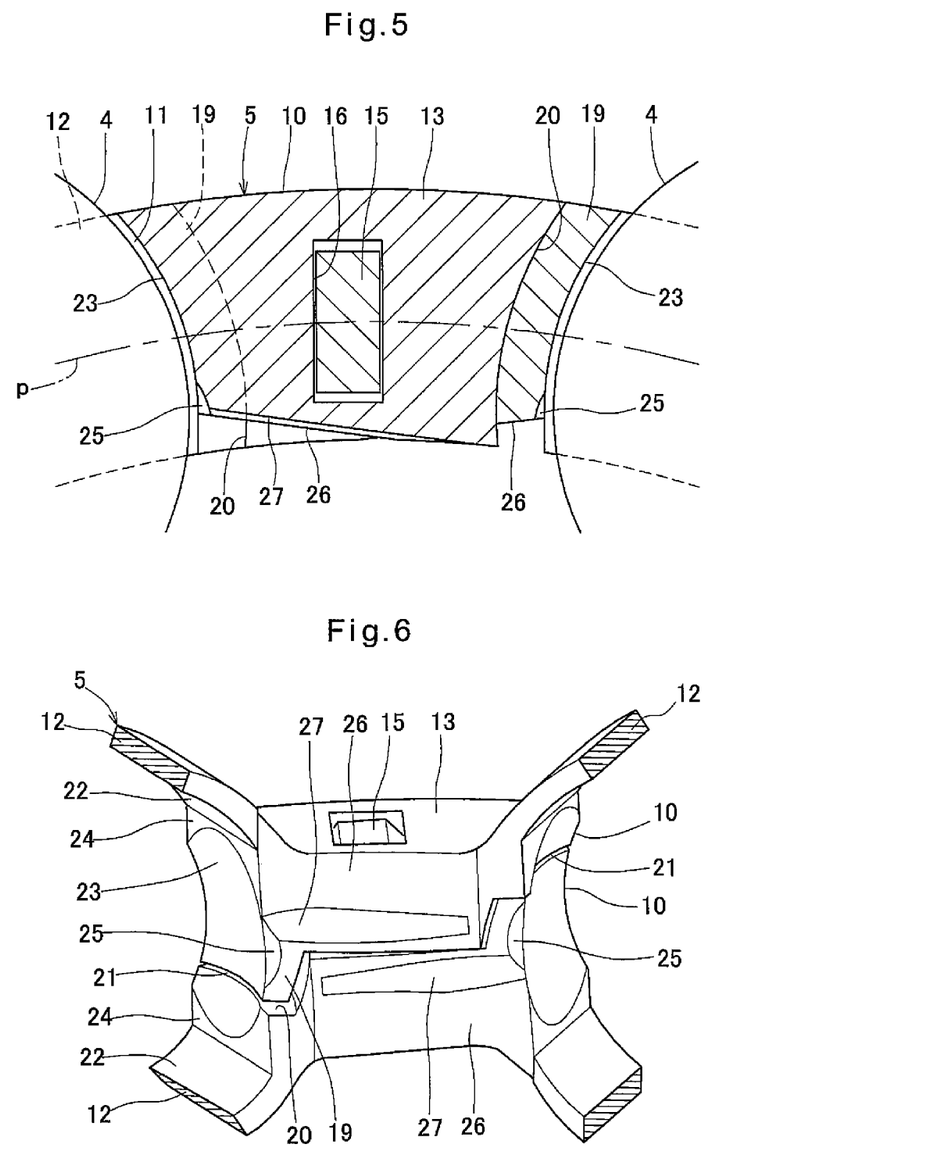
FIG. 5 is an enlarged sectional view taken along the line V-V of FIG. 4.
FIG. 6 is a perspective view of the retainer illustrated in FIG. 2 as seen from the inner diameter side.
Figure 7:
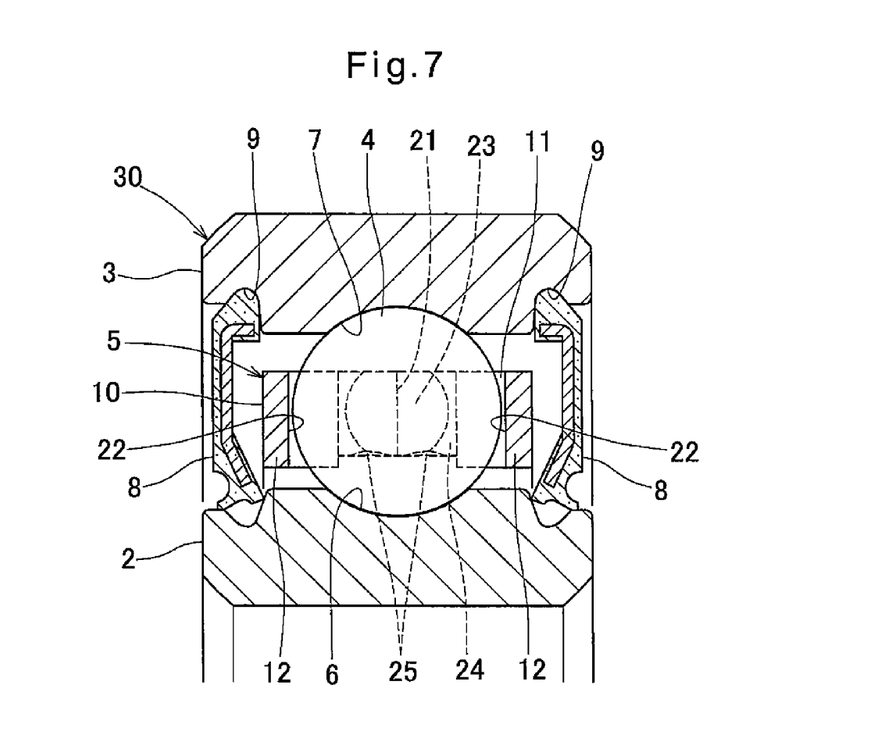
FIG. 7 is sectional view of a ball bearing in which a retainer of synthetic resin according to a second embodiment of the present invention is incorporated.

Concave spherical surfaces 23 are formed at the circumferential ends of the respective pockets 11 so as to extend along the outer peripheries of the balls 4. The balls 4 in the respective pockets 11 are thus guided by the concave spherical surfaces 23. As illustrated in FIG. 5, the concave spherical surfaces 23 are formed on the end surfaces of the respective coupling plates 13 to extend both radially outwardly and radially inwardly from the pitch circle p of the balls 4 so that the concave spherical surfaces 23 circumferentially face the balls 4 on the pitch circle p, which passes through the centers of the balls 4.

As illustrated in FIG. 6, on the end surfaces of the respective coupling plates 13, flat surfaces 24 are formed that meet the respective concave spherical surfaces 23 along a circular arc-shaped ridgeline to surround the concave spherical surfaces 23. The cylindrical surfaces 22 are connected to the axial sides of the respective flat surfaces 24. As illustrated in FIG. 3, axial gaps between the cylindrical surfaces 22 and the balls 4 (pocket gaps in the axial direction) are set to be larger than circumferential gaps between the concave spherical surfaces 23 and the balls 4 (pocket gaps in the circumferential direction) in order to prevent interference between the retainer 5 and the balls 4 due to deformation of the retainer 5 while the bearing is rotating at a high speed.

Figure 4:
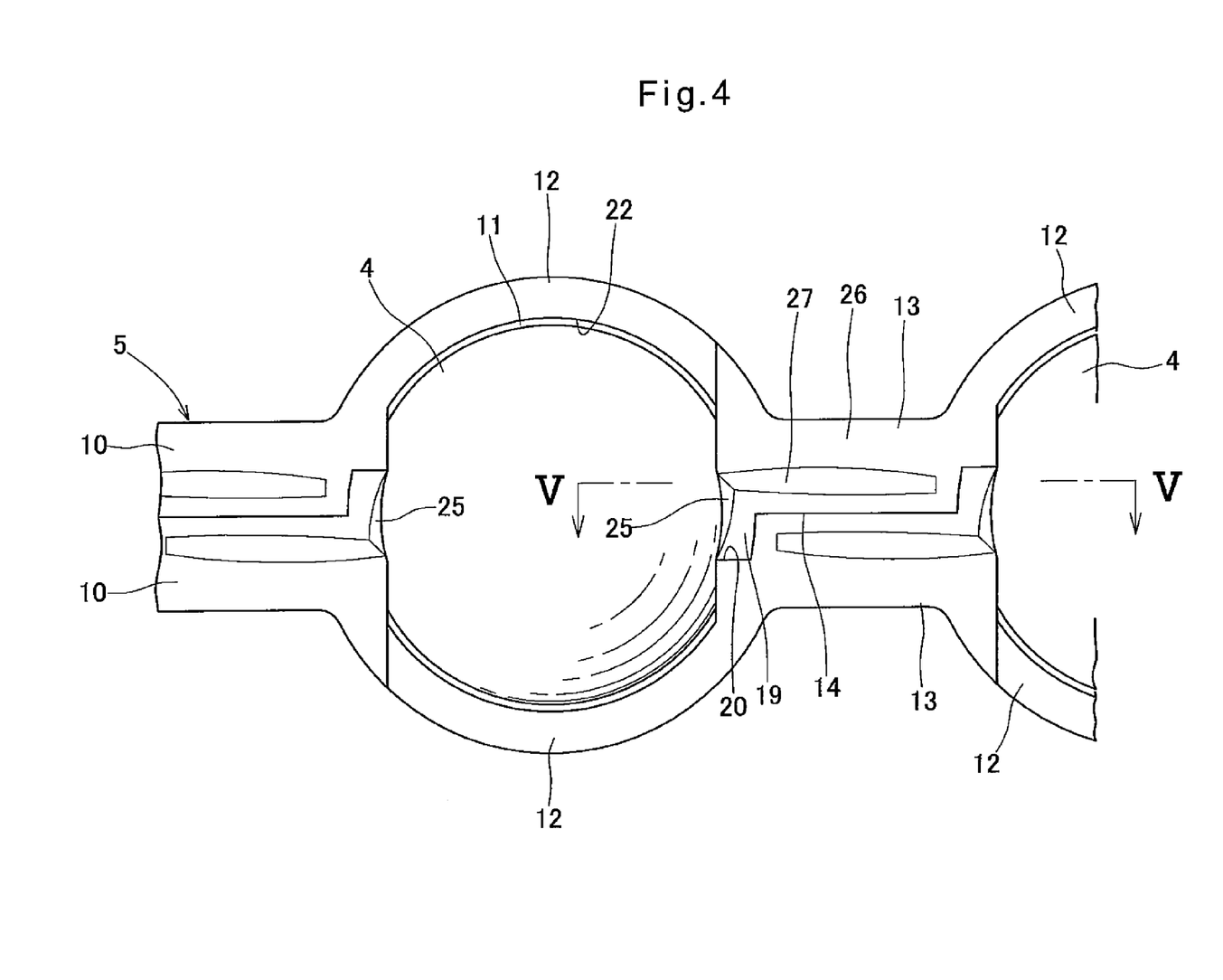
FIG. 4 is a developed view of the retainer illustrated in FIG. 2 as seen from the inner diameter side of the retainer.

As illustrated in FIGS. 4 and 6, two grease reservoirs 25 are provided at the radial inner end of each pocket 11 adjacent to the respective concave spherical surfaces 23. In order to prevent the grease reservoirs 25 from extending to the respective abutment lines 21 between the annular members 10, the grease reservoirs 25 are formed in the respective protruding walls 19 of the respective coupling plates 13 and no grease reservoirs are formed in either of the fitting recesses 20.

As illustrated in FIG. 5, the coupling plates 13 of the annular members 10 are each formed with a grease-guiding slant face 26 on its inner periphery. The grease-guiding slant face 26 is inclined radially outwardly toward one of the grease reservoirs 25 such that its end at the grease reservoir 25 is the farthest from the center of the retainer 5. Since the grease-guiding slant face 26 is inclined in this direction, grease adhered to the grease-guiding slant face 26 can be smoothly guided to the grease reservoir 25 when centrifugal force acts on the grease.

The grease-guiding slant face 26 is formed with a grease-guiding groove 27 that leads to the grease reservoir 25. The grease-guiding groove 27 has a bottom inclined, as with the grease-guiding slant face 26, radially outwardly toward the grease reservoir 25 such that its end at the grease reservoir 25 is the farthest from the center of the retainer 5. Since the grease-guiding groove 27 is inclined in this direction, grease in the grease-guiding groove 27 can be smoothly guided to the grease reservoir 25 when centrifugal force acts on the grease.

If this ball bearing 1 is used in a high-speed range where the dmn value (product of the revolution per minute (rpm) of the ball bearing 1 and pitch circle diameter (mm) of the balls 4) exceeds one million, large centrifugal force acts on the retainer 5. The retainer 5 is radially expanded by the centrifugal force, thus causing the pockets 11 of the retainer 5 to move radially outwardly. When the retainer 5 is radially expanded by the centrifugal force, the pockets 11 of the retainer 5 are also stretched in the circumferential direction, thus causing the width of the pockets 11 to narrow in the axial direction.

Instead of the retainer 5 according to this embodiment, in which the inner surfaces of the pocket walls 12 constituting the axial ends of the pockets 11 are cylindrical surfaces 22, if a conventional retainer, in which the inner surfaces of the pocket walls 12 are concave spherical surfaces, were used, abnormal heat generation in the bearing or abnormal wear of the retainer might arise due to the axial ends of the pockets 11 (especially, parts on the inner diameter side of the pitch circle p of the balls 4) interfering with the balls 4.

On the other hand, in the retainer 5 according to this embodiment, parts at the axial ends of the pockets 11 or at least parts on the inner diameter side of the pitch circle p of the balls 4 are cylindrical surfaces 22. Therefore, it is possible to prevent the axial ends of the pockets 11 in the retainer 5 from interfering with the balls 4 when the following two phenomena happen at the same time: (1) the retainer 5 is radially expanded and the pockets 11 in the retainer 5 move radially outwardly; and (2) the pockets 11 in the retainer 5 are stretched in the circumferential direction and the width of the pockets 11 narrows in the axial direction. Therefore, abnormal heat generation in the ball bearing 1 or wear of the retainer 5 due to interference between the retainer 5 and the balls 4 does not arise while the bearing is rotating at a high speed.

In this retainer 5, the concave spherical surfaces 23 are formed at the circumferential ends of the respective pockets 11 to extend along the outer peripheries of the balls 4. Therefore, it is possible to restrain the movement of the retainer 5 by contact with the concave spherical surfaces 23 and the balls 4 while the bearing is rotating and to prevent a collision sound between the retainer 5 and the balls 4 (retainer sound). The concave spherical surfaces 23 can be formed only on the outer diameter side of the pitch circle p of the balls 4. However, as illustrated by the above embodiment, if the concave spherical surfaces 23 are formed in such a way as to extend to both the outer diameter side of the pitch circle p of the balls 4 and the inner diameter side thereof, the balls 4 can be guided more effectively by the concave spherical surfaces 23. Therefore, it is possible to prevent a retainer sound effectively and to enhance quietness. Furthermore, in this embodiment, the balls 4 formed of ceramics that are lower in specific gravity than iron are used. Therefore, when the balls 4 and the retainer 5 collide with each other, the impact is lower and quietness is higher while the bearing is rotating at a high speed.

In this retainer 5, the respective annular members 10 are configured such that the abutment lines 21 of the two annular members 10 are offset from the center in the axial direction of the pockets 11. There are no abutment lines 21 at portions where the balls 4 and the retainer 5 contact each other most strongly (axial centers of the pockets 11). Therefore, even if the respective annular members 10 are radially expanded by centrifugal force and slightly stepped portions form along the abutment lines 21, it is possible to restrain an influence due to the stepped portions and to stabilize the movement of the retainer 5 while the bearing is rotating at a high speed.

In this retainer 5, the grease reservoirs 25 are formed in such a way as to avoid the abutment lines 21. Therefore, it is possible to prevent grease stored inside the grease reservoirs 25 from leaking through the abutment lines 21 due to centrifugal force while the bearing is rotating at a high speed and to secure lubrication performance between the pockets 11 and the balls 4 while the bearing is rotating at a high speed. As a result thereof, it is possible to prevent more effectively abnormal heat generation in the ball bearing 1 or wear of the retainer 5 while the bearing is rotating at a high speed.

In this retainer 5, because the grease-guiding slant faces 26 are provided in the inner peripheries of the respective annular members 10, when grease adheres to the grease-guiding slant faces 26, the grease is guided along the grease-guiding slant faces 26 by centrifugal force and is supplied to the grease reservoirs 25. Therefore, lubrication performance between the pockets 11 and the balls 4 is high while the bearing is rotating at a high speed and it is possible to prevent effectively abnormal heat generation in the ball bearing 1 or wear of the retainer 5 while the bearing is rotating at a high speed. Furthermore, because the grease-guiding grooves 27 are provided on the grease-guiding slant faces 26, it is possible to supply more effectively grease to the grease reservoirs 25.

A second embodiment of the present invention is described based on FIGS. 7 through 11. This ball bearing 30 is a deep groove ball bearing for a motor that rotates at a high speed, as with the first embodiment. As for elements corresponding to those of the first embodiment, the same reference numerals used in the first embodiment are used and further description thereof is omitted.

Figure 8:
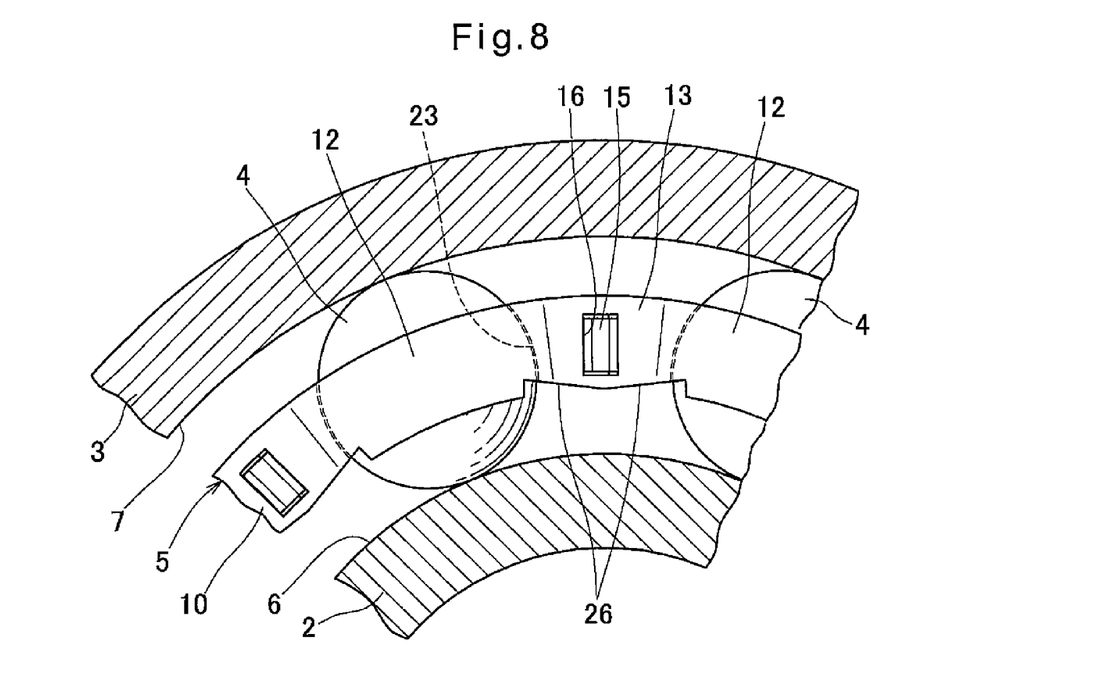
FIG. 8 is a sectional view of the ball bearing illustrated in FIG. 7, taken along a plane perpendicular to the axis of the ball bearing.
Figure 9:
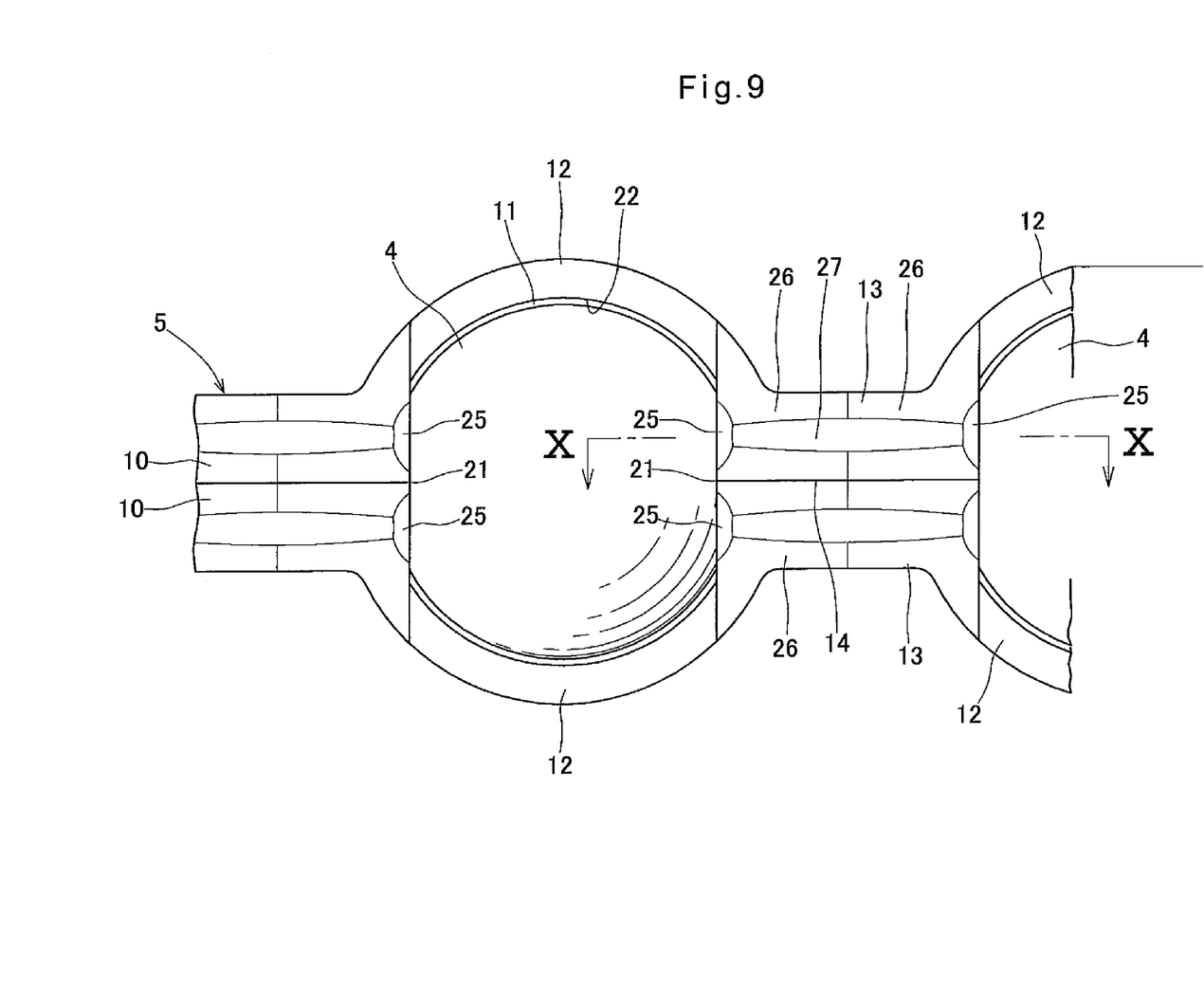
FIG. 9 is a developed view of the retainer illustrated in FIG. 8 as seen from the inner diameter side.

As illustrated in FIG. 8, respective annular members 10 include pocket walls 12 and coupling plates 13 that connect the pocket walls 12 circumferentially adjacent to each other. As illustrated in FIG. 9, the respective coupling plates 13 include an abutment surface 14 in such a way that surfaces thereof contact each other when the two annular members 10 are coupled with each other. Protruding walls 19 and fitting recesses 20 as in the first embodiment are not provided on the abutment surface 14 so that abutment lines 21 on the inner surfaces of pockets 11 between the two annular members 10 are in the axial centers of the pockets 11.

Figure 11:
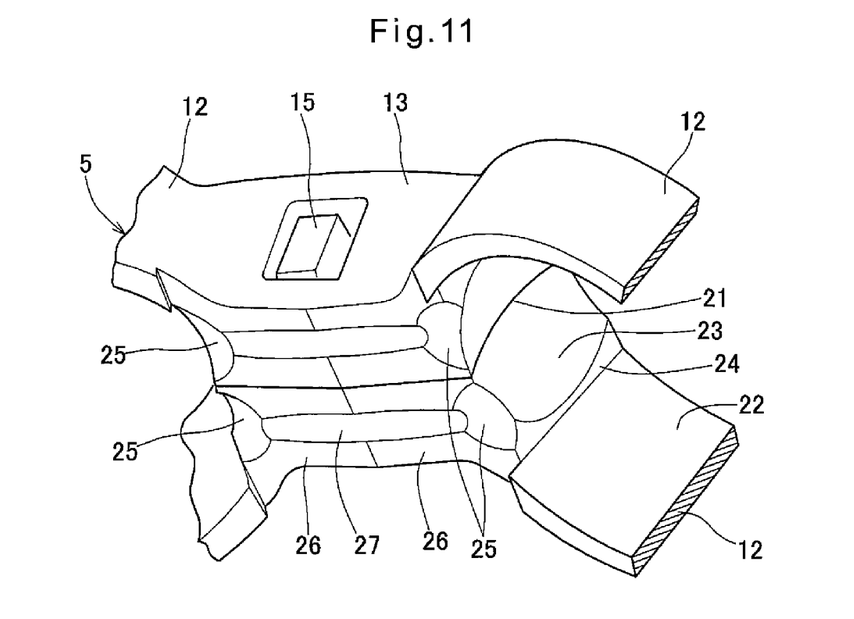
FIG. 11 is a perspective view of the retainer illustrated in FIG. 8 as seen from the inner diameter side.

As illustrated in FIGS. 9 and 11, grease reservoirs 25 are provided adjacent to respective concave spherical surfaces 23 at the radial inner ends of the respective pockets 11. The grease reservoirs 25 are formed on both sides of the respective coupling plates 13 in such a way as to be offset from the axial centers of the pockets 11 so that the grease reservoirs 25 do not extend to the abutment lines 21. As a result thereof, four grease reservoirs 25 are formed per pocket 11.

Figure 10:
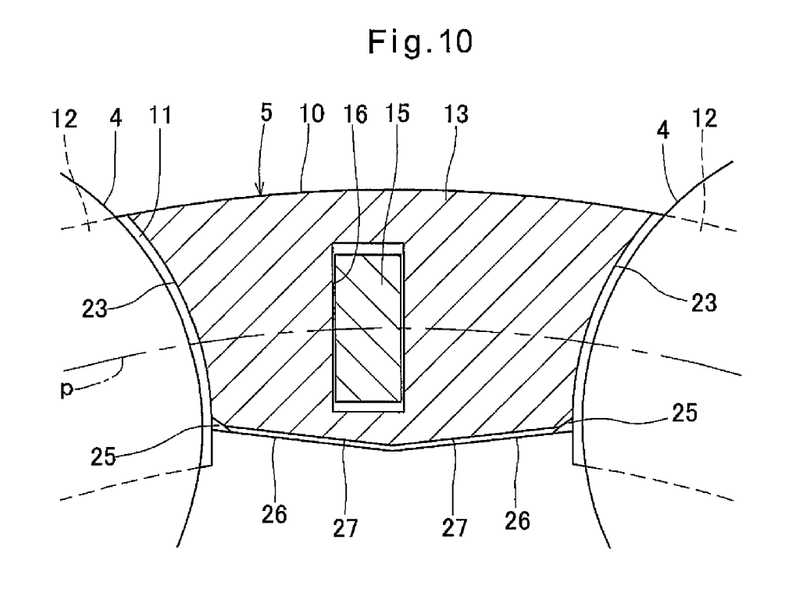
FIG. 10 is an enlarged sectional view taken along the line X-X of FIG. 9.

As illustrated in FIG. 10, the coupling plates 13 of the annular members 10 are each formed with a grease-guiding slant face 26 on its inner periphery. The grease-guiding slant face 26 is inclined radially outwardly from its circumferential center toward the grease reservoirs 25 at the respective circumferential ends of the grease-guiding slant faces 26 such that its circumferential ends are the farthest from the center of the retainer 5. Since the grease-guiding slant face 26 is inclined in this direction, when centrifugal force acts on grease adhered to the grease-guiding slant face 26, the grease can be smoothly guided to the grease reservoirs 25.

A grease-guiding groove 27 is formed on each grease-guiding slant face 26 to extend to the grease reservoirs 25 at both ends. The bottom of the grease-guiding groove 27 is also inclined radially outwardly from its circumferential center toward the grease reservoirs 15 at both circumferential ends of the grease-guiding groove 27 such that its circumferential ends are the farthest from the center of the retainer 5. Since the grease-guiding groove 27 is inclined in this direction, when centrifugal force acts on grease in the grease-guiding groove 27, the grease can be smoothly guided to the grease reservoirs 25.

In this retainer 5, protruding walls 19 or fitting recesses 20 as in the first embodiment are not provided at the ends of the abutment surface 14 of the two annular members 10. Therefore, when the bearing is used under a situation in which rotation speed thereof is accelerated or decelerated rapidly repeatedly, no protruding walls 19 get deformed or damaged by a load generated between balls 4 and the retainer 5 so that durability of the retainer 5 is excellent.

In this ball bearing 30, at least portions of the axial ends of the pockets 11 that are located radially inward of the pitch circle p of the balls 4 are cylindrical surfaces 22 as in the first embodiment. Therefore, it is possible to prevent the axial ends of the pockets 11 in the retainer 5 from interfering with the balls 4 while the bearing is rotating at a high speed. As a result thereof, abnormal heat generation in the ball bearing 30 or abnormal wear of the retainer 5 due to interference between the retainer 5 and the balls 4 does not arise. Other effects are the same as in the first embodiment.

Figure 12:
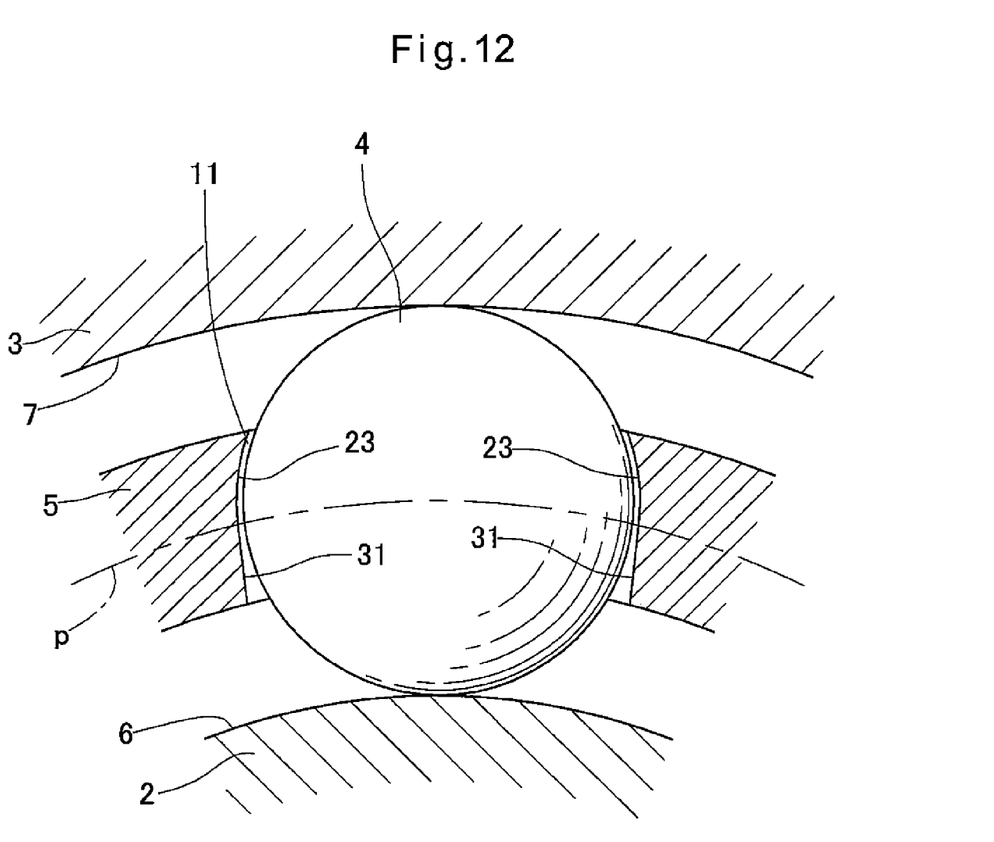
FIG. 12 is a sectional view illustrating different concave spherical surfaces at the circumferential ends of a pocket.

As illustrated in FIG. 12, the concave spherical surfaces 23 at the circumferential ends of the pockets 11 may be formed on the outer diameter side of the pitch circle p of the balls 4, and cylindrical surfaces 31 that extend in the radial direction of the retainer 5 may be formed at the circumferential ends of the pockets 11 in such a way as to be smoothly connected with the concave spherical surfaces 23. Under this situation, when the retainer 5 is radically largely expanded by powerful centrifugal force while the bearing is rotating at a super-high speed, in which the dmn value largely exceeds one million, and the pockets 11 in the retainer 5 move greatly radially outwardly, it is possible to prevent the circumferential ends of the pockets 11 in the retainer 5 from interfering with the balls 4. Therefore, it is possible to prevent abnormal heat generation in the bearing or abnormal wear of the retainer 5 due to interference between the retainer 5 and the balls 4 while the bearing is rotating at a super-high speed.

In the above first and second embodiments, the cylindrical surfaces 22 at the axial ends of the pockets 11 do not need to be cylindrical surfaces strictly in a mathematical sense. The cylindrical surfaces 22 may be cylindrical surfaces whose inner surfaces have a shape that linearly extends in the radial direction of the retainer 5 and may be cylindrical surfaces having a slight taper in such a way that the diameter thereof becomes smaller toward the center of the retainer 5 as one example. The above descriptions about the cylindrical surfaces 22 apply to the cylindrical surfaces 31 at the circumferential ends of the pockets 11 illustrated in FIG. 12.

The invention claimed is:

1. A retainer of synthetic resin for use in a ball bearing, the retainer comprising:
    first and second annular members (10) made of synthetic resin and facing each other in an axial direction,
    the annular members being configured to define therebetween a plurality of circumferentially spaced apart pockets (11), each of the pockets (11) being configured to receive a ball (4) so that the balls (4) are arranged circumferentially spaced apart along a pitch circle (p), each of the pockets (11) having two circumferential ends along a circumferential direction of the annular members (10), and each of the pockets (11) having two axial ends along an axial direction of the annular members (10),
    wherein a concave spherical surface (23) is formed at each of the circumferential ends of each of the pockets (11), so that the concave spherical surfaces are arranged to extend along outer peripheries of the balls (4), and
    wherein a cylindrical surface (22) is formed at each of the axial ends of each of the pockets (11), at least at portions of each of the pockets (11) located radially inwardly of the pitch circle (p) so as to extend in a radial direction of the retainer,
    wherein the first annular member (10) comprises first abutment surfaces (14), and the second annular member (10) comprises second abutment surfaces (14), such that the first abutment surfaces are configured to be in surface contact with the second abutment surfaces, respectively,
    wherein each of the first abutment surfaces (14) has first and second ends,
    wherein each of the second abutment surfaces (14) has first and second ends,
    wherein a protruding wall (19) protrudes from the first end of each of the first abutment surfaces and from the first end of each of the second abutment surfaces,
    wherein a fitting recess (20) is formed at the second end of each of the first abutment surfaces and at the second end of each of the second abutment surfaces,
    wherein the protruding walls (19) of the first abutment surfaces (14) are configured so as to be fitted into the fitting recesses (20), respectively, of the second abutment surfaces (14), and the protruding walls (19) of the second abutment surfaces (14) are configured so as to be fitted into the fitting recesses (20), respectively, of the first abutment surfaces (14), so that an abutment line (21) of the first and second annular members (10) is formed at each of the circumferential ends of each of the pockets on an inner wall of each of the pockets,
    wherein, for each of the pockets (11), the abutment lines (21) are offset from an axial center of the pocket (11), and
    wherein the first annular member (10) has the same shape as the second annular member (10).

2. The retainer of synthetic resin for use in a ball bearing according to claim 1, wherein the concave spherical surfaces (23) are formed at the circumferential ends of the respective pockets (11) so as to extend both radially outwardly and radially inwardly from the pitch circle (p).

3. The retainer of synthetic resin for use in a ball bearing according to claim 2, wherein grease reservoirs (25) are formed at radial inner ends of the respective pockets (11).

4. A ball bearing comprising:
    an inner race (2);
    an outer race (3);
    a plurality of balls (4) mounted between the inner race (2) and the outer race (3) so as to be spaced from each other in a circumferential direction; and
    the retainer (5) of synthetic resin according to claim 2, the retainer retaining the balls (4).

5. The retainer of synthetic resin for use in a ball bearing according to claim 1, wherein the concave spherical surfaces (23) at the circumferential ends of the respective pockets (11) are formed at portions of each of the pockets (11) located radially outwardly of the pitch circle (p), and cylindrical surfaces (31) are formed at the circumferential ends of each of the pockets (11) so as to extend in a radial direction of the annular members (10) and be connected with the concave spherical surfaces (23).

6. The retainer of synthetic resin for use in a ball bearing according to claim 5, wherein grease reservoirs (25) are formed at radial inner ends of the respective pockets (11).

7. A ball bearing comprising:
    an inner race (2);
    an outer race (3);
    a plurality of balls (4) mounted between the inner race (2) and the outer race (3) so as to be spaced from each other in a circumferential direction; and
    the retainer (5) of synthetic resin according to claim 5, the retainer retaining the balls (4).

8. The retainer of synthetic resin for use in a ball bearing according to claim 1, wherein each of the pockets (11) has a radially inner end, and a grease reservoir (25) is formed at the radial inner end of each of the pockets (11).

9. A ball bearing comprising:
    an inner race (2);

an outer race (3);
a plurality of balls (4) mounted between the inner race (2) and the outer race (3) so as to be spaced from each other in a circumferential direction; and
the retainer (5) of synthetic resin according to claim 5, the retainer retaining the balls (4).

10. The retainer of synthetic resin for use in a ball bearing according to claim 1, wherein, for each of the pockets (11), the abutment line (21) at one of the circumferential ends of the pocket (11) is offset from the axial center of the pocket in a first axial direction, and the abutment line (21) at the other of the circumferential ends of the pocket (11) is offset from the axial center of the pocket (11) in a second axial direction opposite the first axial direction.

11. A ball bearing comprising:
an inner race (2);
an outer race (3);
a plurality of balls (4) mounted between the inner race (2) and the outer race (3) so as to be spaced from each other in a circumferential direction; and
the retainer (5) of synthetic resin according to claim 1, the retainer retaining the balls (4).

12. The ball bearing according to claim 11, wherein the balls (4) are made of a ceramic material which is lower in specific gravity than iron.

13. A retainer of synthetic resin for use in a ball bearing, the retainer comprising:
two annular members (10) made of synthetic resin and facing each other in an axial direction,
the annular members being configured to define therebetween a plurality of circumferentially spaced apart pockets (11), each of the pockets (11) being configured to receive a ball (4) so that the balls (4) are arranged circumferentially spaced apart along a pitch circle (p), each of the pockets (11) having two circumferential ends along a circumferential direction of the annular members (10), and each of the pockets (11) having two axial ends along an axial direction of the annular members (10),
wherein a concave spherical surface (23) is formed at each of the circumferential ends of each of the pockets (11), so that the concave spherical surfaces are arranged to extend along outer peripheries of the balls (4),
wherein a cylindrical surface (22) is formed at each of the axial ends of each of the pockets (11), at least at portions of each of the pockets (11) located radially inwardly of the pitch circle (p) so as to extend in a radial direction of the retainer,
wherein each of the pockets (11) has a radially inner end, and a grease reservoir (25) is formed at the radial inner end of each of the pockets (11), and
wherein the grease reservoirs (25) are formed in such a way as to avoid the abutment lines (21) of the two annular members (10).

14. The retainer of synthetic resin for use in a ball bearing according to claim 13, wherein the annular members (10) are each provided with grease-guiding slant faces (26) on an inner periphery thereof, wherein the slant faces are each inclined in a direction in which grease can be guided to a corresponding one of the grease reservoirs (25) when centrifugal force acts on the grease.

15. The retainer of synthetic resin for use in a ball bearing according to claim 13, wherein the two annular members (10) comprise a first annular member and a second annular member,
wherein the first annular member (10) comprises first abutment surfaces (14), and the second annular member (10) comprises second abutment surfaces (14), such that the first abutment surfaces are configured to be in surface contact with the second abutment surfaces, respectively,
wherein each of the first abutment surfaces (14) has first and second ends,
wherein each of the second abutment surfaces (14) has first and second ends,
wherein a protruding wall (19) protrudes from the first end of each of the first abutment surfaces and from the first end of each of the second abutment surfaces,
wherein a fitting recess (20) is formed at the second end of each of the first abutment surfaces and at the second end of each of the second abutment surfaces,
wherein the protruding walls (19) of the first abutment surfaces (14) are configured so as to be fitted into the fitting recesses (20), respectively, of the second abutment surfaces (14), and the protruding walls (19) of the second abutment surfaces (14) are configured so as to be fitted into the fitting recesses (20), respectively, of the first abutment surfaces (14), so that an abutment line (21) of the first and second annular members (10) is formed at each of the circumferential ends of each of the pockets on an inner wall of each of the pockets,
wherein, for each of the pockets (11), the abutment lines (21) are offset from an axial center of the pocket (11), and
wherein the first annular member (10) has the same shape as the second annular member (10).

16. A ball bearing comprising:
an inner race (2);
an outer race (3);
a plurality of balls (4) mounted between the inner race (2) and the outer race (3) so as to be spaced from each other in a circumferential direction; and
the retainer (5) of synthetic resin according to claim 13, the retainer retaining the balls (4).

17. A retainer of synthetic resin for use in a ball bearing, the retainer comprising:
two annular members (10) made of synthetic resin and facing each other in an axial direction,
the annular members being configured to define therebetween a plurality of circumferentially spaced apart pockets (11), each of the pockets (11) being configured to receive a ball (4) so that the balls (4) are arranged circumferentially spaced apart along a pitch circle (p), each of the pockets (11) having two circumferential ends along a circumferential direction of the annular members (10), and each of the pockets (11) having two axial ends along an axial direction of the annular members (10),
wherein a concave spherical surface (23) is formed at each of the circumferential ends of each of the pockets (11), so that the concave spherical surfaces are arranged to extend along outer peripheries of the balls (4), and
wherein a cylindrical surface (22) is formed at each of the axial ends of each of the pockets (11), at least at portions of each of the pockets (11) located radially inwardly of the pitch circle (p) so as to extend in a radial direction of the retainer,
wherein each of the pockets (11) has a radially inner end, and a grease reservoir (25) is formed at the radial inner end of each of the pockets (11), and
wherein the annular members (10) are each provided with grease-guiding slant faces (26) on an inner periphery thereof, wherein the slant faces are each inclined in a direction in which grease can be guided to a corresponding one of the grease reservoirs (25) when centrifugal force acts on the grease.

18. The retainer of synthetic resin for use in a ball bearing according to claim 17, wherein the grease-guiding slant faces (26) are each provided with a grease-guiding groove (27) that leads to the corresponding one of the grease reservoirs (25), the grease-guiding groove being inclined in a direction in which grease can be guided to the corresponding one of the grease reservoirs (25) when centrifugal force acts on the grease.

19. A ball bearing comprising:
an inner race (2);
an outer race (3);
a plurality of balls (4) mounted between the inner race (2) and the outer race (3) so as to be spaced from each other in a circumferential direction; and
the retainer (5) of synthetic resin according to claim 18, the retainer retaining the balls (4).

20. The retainer of synthetic resin for use in a ball bearing according to claim 17,
wherein the two annular members (10) comprise a first annular member and a second annular member,
wherein the first annular member (10) comprises first abutment surfaces (14), and the second annular member (10) comprises second abutment surfaces (14), such that the first abutment surfaces are configured to be in surface contact with the second abutment surfaces, respectively,
wherein each of the first abutment surfaces (14) has first and second ends,
wherein each of the second abutment surfaces (14) has first and second ends,
wherein a protruding wall (19) protrudes from the first end of each of the first abutment surfaces and from the first end of each of the second abutment surfaces,
wherein a fitting recess (20) is formed at the second end of each of the first abutment surfaces and at the second end of each of the second abutment surfaces,
wherein the protruding walls (19) of the first abutment surfaces (14) are configured so as to be fitted into the fitting recesses (20), respectively, of the second abutment surfaces (14), and the protruding walls (19) of the second abutment surfaces (14) are configured so as to be fitted into the fitting recesses (20), respectively, of the first abutment surfaces (14), so that an abutment line (21) of the first and second annular members (10) is formed at each of the circumferential ends of each of the pockets on an inner wall of each of the pockets,
wherein, for each of the pockets (11), the abutment lines (21) are offset from an axial center of the pocket (11), and
wherein the first annular member (10) has the same shape as the second annular member (10).

21. A ball bearing comprising:
an inner race (2);
an outer race (3);
a plurality of balls (4) mounted between the inner race (2) and the outer race (3) so as to be spaced from each other in a circumferential direction; and
the retainer (5) of synthetic resin according to claim 17, the retainer retaining the balls (4).

* * * * *